(12) United States Patent
Nishino et al.

(10) Patent No.: US 7,368,154 B2
(45) Date of Patent: May 6, 2008

(54) HEAT-RESISTANT PLASTIC TUBE

(75) Inventors: Todomu Nishino, Nabari (JP); Yuji Nakabayashi, Nabari (JP); Ryoji Manai, Nabari (JP)

(73) Assignee: Nitta Moore Company, Osaka (JP)

( * ) Notice: Subject to any disclaimer, the term of this patent is extended or adjusted under 35 U.S.C. 154(b) by 0 days.

(21) Appl. No.: 10/761,508

(22) Filed: Jan. 20, 2004

(65) Prior Publication Data
US 2004/0151859 A1    Aug. 5, 2004

Related U.S. Application Data

(63) Continuation of application No. PCT/JP02/07365, filed on Jul. 19, 2002.

(30) Foreign Application Priority Data

Jul. 19, 2001 (JP) .............................. 2001-220495

(51) Int. Cl.
*B29D 22/00* (2006.01)
*B29D 23/00* (2006.01)
*B32B 1/08* (2006.01)

(52) U.S. Cl. ............... 428/36.9; 428/36.91; 428/36.92; 428/35.7; 428/480; 138/118

(58) Field of Classification Search ............... 428/35.7, 428/36.8, 480, 36.9, 36.91, 36.92; 138/118
See application file for complete search history.

(56) References Cited

U.S. PATENT DOCUMENTS 4,215,032 A * 7/1980 Kobayashi et al. ......... 524/377
4,510,968 A * 4/1985 Rau ........................... 137/590
5,380,571 A * 1/1995 Ozawa et al. ............... 428/36.9
5,960,977 A * 10/1999 Ostrander et al. .......... 220/86.1
6,131,618 A   10/2000 Brudny et al.
6,179,008 B1   1/2001 Kawazura et al.
6,294,234 B1 * 9/2001 Kertesz ....................... 428/34.7

FOREIGN PATENT DOCUMENTS

| DE | 198 31 898 A1 | 1/2000 |
| EP | 0 637 509 A1 | 2/1995 |
| EP | 0 821 035 A1 | 1/1998 |
| EP | 0 875 358 A1 | 11/1998 |

(Continued)

OTHER PUBLICATIONS

Patent Abstracts of Japan for JP2000-202890 published on Jul. 25, 2000.

(Continued)

*Primary Examiner*—Michael C. Miggins
(74) *Attorney, Agent, or Firm*—Darby & Darby P.C.

(57) ABSTRACT

A heat-resistant plastic tube is mainly made of a polyester-based elastomer and exhibits a change amount in angle of ±10° or less in a shape retainability performance test, a change rate in inner diameter of ±2% or less in a dimensional stability performance test, a change rate in yield strength of ±30% or less in a flexibility retainability performance test. The heat-resistant plastic tube can be subjected to a thermal bending at a temperature in a use environment or higher and exhibits excellent retention of the bent shape through the thermal bending after being left in the use environment.

23 Claims, 4 Drawing Sheets

FOREIGN PATENT DOCUMENTS

| | | |
|---|---|---|
| EP | 1 249 654 A1 | 10/2002 |
| JP | 11-325381 A1 | 11/1999 |
| JP | 2000-202890 A1 | 7/2000 |
| JP | 2000290483 * | 10/2000 |
| JP | 2000290483 A * | 10/2000 |
| JP | 2000-319470 A1 | 11/2000 |

OTHER PUBLICATIONS

Patent Abstracts of Japan for JP11-325381 published on Nov. 26, 1999.

Patent Abstracts of Japan for JP2000-319470 published on Nov. 21, 2000.

Supplementary European Search Report completed Aug. 24, 2005.

* cited by examiner

After thermal bending

After heat-treatment at 150°C x 1hr

HEAT-RESISTANT PLASTIC TUBE

CROSS-REFERENCE TO RELATED APPLICATION

This application is a Continuation of International Patent Application Serial No. PCT/JP02/07365 filed Jul. 19, 2002, which was published in Japanese on Jan. 30, 2003 as WO 03/008850 A1.

TECHNICAL FIELD

This invention relates to a heat resistant tube that can be thermally bent at a temperature of the environment in which it is used or higher, and exhibits excellent retention of the shape after a thermal bending even if being left at the environmental temperature after the thermal bending, and particularly, to a fuel feed plastic tube having heat resistance to be required for use in, for example, an engine compartment.

DESCRIPTION OF THE RELATED ART

As density of an engine compartment of a motor vehicle with gears and devices has been advances in recent years, a temperature in the engine compartment tends to rise and in some case the maximum temperature reaches as high as 150° C. Various kinds of tubes used in a motor vehicle are generally arranged in position after a thermal bending into required shapes. When these various kinds of tubes thermally bent accordingly are exposed to a high temperature, they usually deform and suffer change in the bent shape. On such a change in the bent shape, a plastic tube is brought into contact with a high temperature portion in its neighborhood and thereby strength of the tube is reduced, which leads to a danger of bursting.

When a plastic tube is exposed to a high temperature for a given period, the tube generally loses its flexibility, and thereby there arises a possibility to cause a noise problem due to vibration during driving of a motor vehicle. Furthermore, due to change in a bent shape of a tube or increase in stiffness of the tube, when an excessive stress is imposed on a connecting section between a joint and a tube, there arises another possibility to cause a breakage of the joint or the tube.

Change in diametral dimension of a tube dependent on the temperature in a thermal bending usually unfavorably affects sealing performance in a connecting section and retainability performance in tube's characteristics.

The invention has been made with attention to the above actual circumstances and it is an object of the invention to provide a heat resistant tube that can be thermally bent at a temperature of the environment in which it is used or higher, and exhibits excellent retention of the resultant bent shape even if being left at the environmental temperature after the thermal bending.

It is another object of the invention to provide a thermally bent tube excellent in heat resistance that exhibits a small change in diameter and retains flexibility.

It is still another object of the invention to provide a tube that exhibits excellent heat resistance and can retain its thermally bent shape, its dimensions and its flexibility even in a harsh environmental atmosphere, for example, within an engine compartment of a motor vehicle where a maximum temperature reaches as high as 150° C.

SUMMARY OF THE INVENTION

A heat resistant plastic tube of the invention is substantially made of a polyester-based elastomer and exhibits a change amount in angle of ±10° or less in a shape retainability performance test, a change rate in inner diameter of ±2% or less in a dimensional stability performance test, and a change rate in yield strength of ±30% or less in a flexibility retainability performance test.

A heat resistant plastic tube of the invention has at least an inner layer substantially made of a polyester-based elastomer and an outer layer formed on an outside of the inner layer and substantially made of a crystalline polyester-based resin, and exhibits a change amount in angle of ±10° or less in a shape retainability performance test, a change rate in inner diameter of ±2% or less in a dimensional stability performance test, and a change rate in yield strength of ±30% in a flexibility retainability performance test.

A heat resistant plastic tube of the invention has at least an inner layer substantially made of a crystalline polyester-based resin and an outer layer formed on an outside of the inner layer and substantially made of a polyester-based elastomer, and exhibits a change amount in angle of ±10° or less in a shape retainability performance test, a change rate in inner diameter of ±2% or less in a dimensional stability performance test, and a change rate in yield strength of ±30% in a flexibility retainability performance test.

A heat resistant plastic tube of the invention has at least an inner layer made substantially of a polyester-based elastomer, an intermediate layer formed on an outside of the inner layer and substantially made of a crystalline polyester-based resin, and an outer layer formed on an outside of the intermediate layer and substantially made of a polyester-based elastomer, and exhibits a change amount in angle of ±10° or less in a shape retainability performance test, a change rate in inner diameter of ±2% in a dimensional stability performance test, and a change rate in yield strength of ±30% in a flexibility retainability performance test.

A heat resistant plastic tube of the invention may be used as a fuel feed tube used within an engine compartment of a motor vehicle.

A heat resistant plastic tube of the invention may have a bellows portion at least part of its length.

In a heat resistant plastic tube of the invention, the innermost layer may have a surface resistivity in the range of from $10^2$ to $10^9$ Ω/sq.

A manufacturing method of a heat resistant plastic tube of the invention, the tube being provided with a bent portion, includes steps of setting a body of a heat resistant plastic tube in a thermal bending mold, heating the tube body in the mold at 190° C. or higher and cooling the tube body in a state being set in the mold.

The foregoing and other objects and effects of the invention will become apparent from the following description with reference to the accompanying drawings.

DETAILED DESCRIPTION OF THE PREFERRED EMBODIMENTS

Heat resistant plastic tubes of the present invention can include the following.

Figure 1:
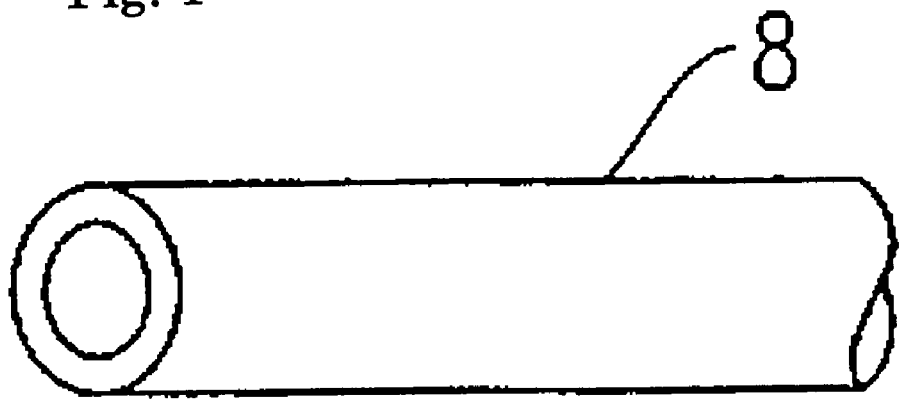
FIG. 1 is a perspective view of an example of a heat resistant tube.

A tube 8, as shown in FIG. 1, is substantially made of a polyester-based elastomer.

Figure 2:
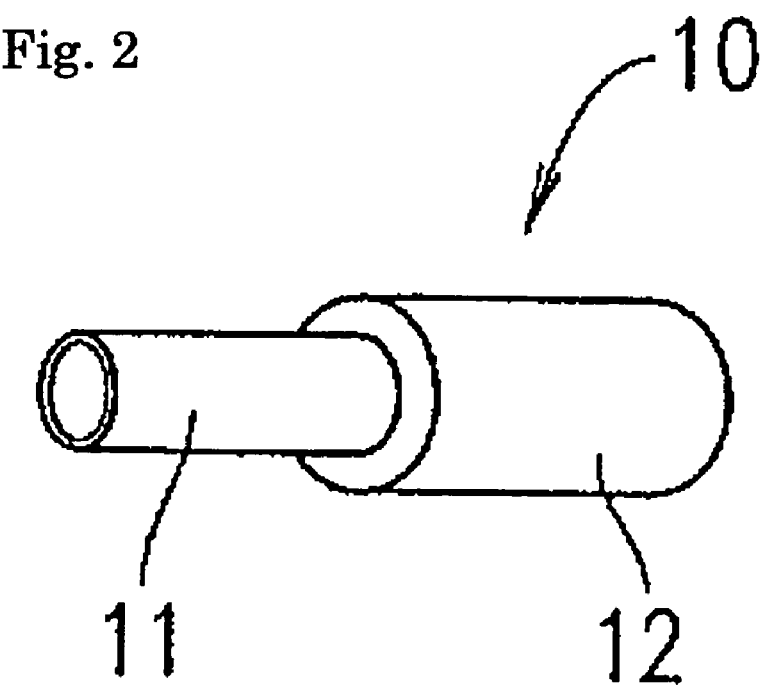
FIG. 2 is a perspective view of another example of a heat resistant tube.

A tube 10, as shown in FIG. 2, has at least an inner layer 11 substantially made of a polyester-based elastomer and an outer layer 12 formed on an outside of the inner layer 11 and substantially made of a crystalline polyester-based resin.

Figure 3:
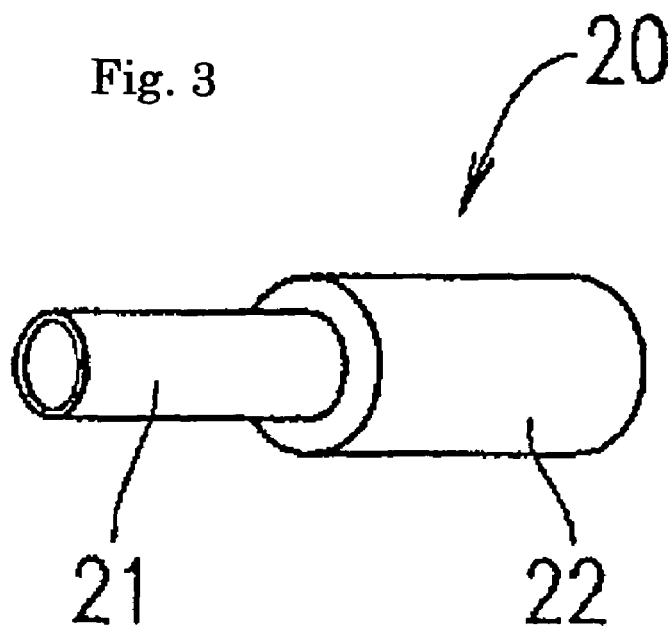
FIG. 3 is a perspective view of still another example of a heat resistant tube.

A tube 20, as shown in FIG. 3, has at least an inner layer 21 substantially made of a crystalline polyester-based resin and an outer layer 22 formed on an outside of the inner layer 21 and substantially made of a polyester-based elastomer.

Figure 4:
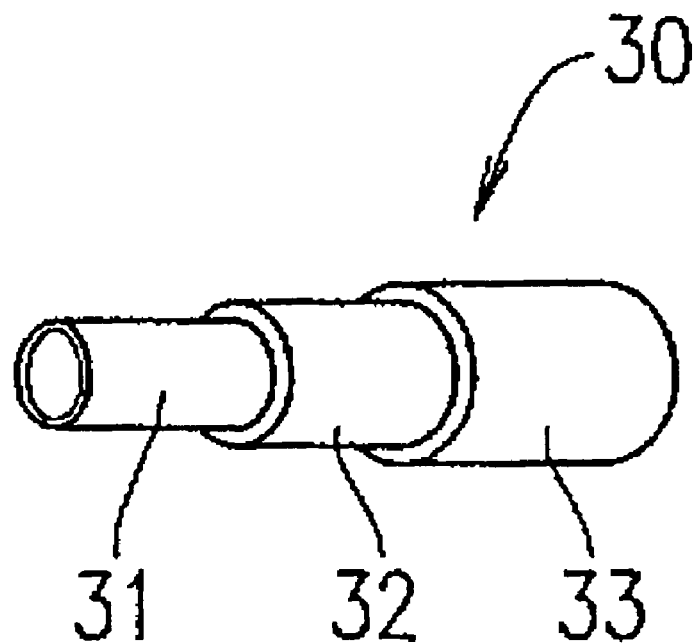
FIG. 4 is a perspective view of still another example of a heat resistant tube.

A tube 30, as shown in FIG. 4, has at least an inner layer 31 substantially made of a polyester-based elastomer, an intermediate layer 32 formed on an outside of the inner layer 31 and substantially made of a crystalline polyester-based resin, and an outer layer 33 formed on an outside of the intermediate layer 32 and substantially made of a polyester-based elastomer.

Figure 5:
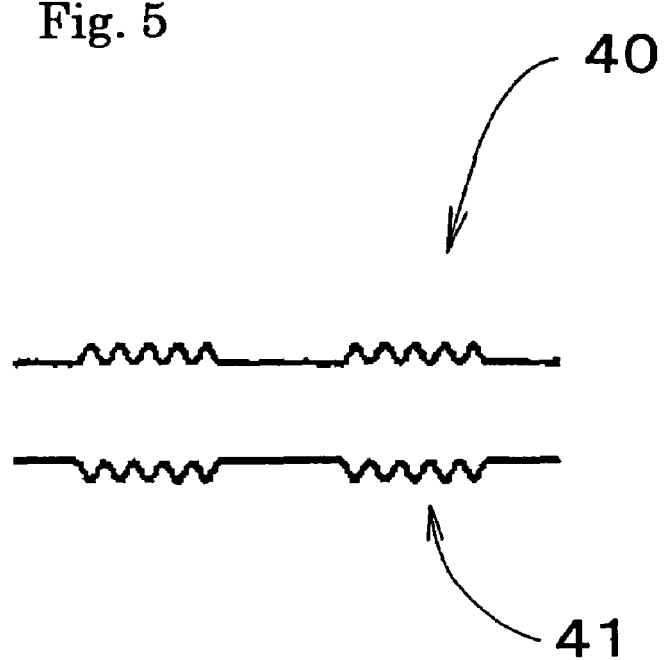
FIG. 5 is a perspective view of still another example of a heat resistant tube.

A tube 40 may have one or more bellows portions 41. FIG. 5 shows a tube with a plurality of bellow portions 41 spaced apart.

Polyester-based elastomers used in the invention can include, e.g. a polyester-polyether block copolymer, and a polyester-polyester block copolymer.

The polyester-polyether block copolymer has an aromatic polyester as a hard segment component and an aliphatic polyether as a soft segment component, while the polyester-polyester block copolymer has an aromatic polyester as a hard segment component and an aliphatic polyester as a soft segment component, wherein soft segment components and hard segment portions are alternately arranged in a repeated manner so as to construct a block copolymer having a nature of a rubber-like elastic body.

Acids and glycols constructing such polyester hard segments are, respectively, mainly aromatic dicarboxylic acids and alkylene glycols having 2 to 15 carbon atoms.

Dicarboxylic acids include, for example, terephthalic acid, isophthalic acid, ethylenebis(p-oxybenzoic acid), naphthalenedicarboxylic acid, 1,4-cyclohexanedicarboxylic acid, and p-(β-hydroxyethoxy)benzoic acid.

Alkylene glycols include, for example, ethylene glycol, propylene glycol, tetramethylene glycol, pentamethylene glycol, 2,2-dimethyltrimethylene glycol, hexamethylene glycol, decamethylene glycol, cyclohexamethylenedimethanol, cyclohexanediethanol, benzenedimethanol, and benzenediethanol.

An aliphatic polyether constituting soft segments of the polyester-polyether block copolymer is a polyoxyalkylene glycol having an average molecular weight of the order in the range of from 500 to 5000. The polyoxyalkylene glycol has an oxyalkylene glycol having an alkylene group with 2 to 9 carbon atoms as a monomer unit.

Preferred examples thereof may be, for example, poly (oxyethylene) glycol, and poly(oxypropylene) glycol, poly (oxytetramethylene) glycol. A polyether may be of a homopolymer, a random copolymer, a block copolymer and a mixture of two or more kinds of polyethers. A small number of aliphatic groups and aromatic groups may be included in a molecular chain of a polyether. A modified polyethers having, for example, sulfur, nitrogen, and phosphorus may also be used.

Examples of aliphatic polyesters constituting soft segments of the polyester-polyester block copolymer includes a condensation type polyester obtained by a dehydration condensation reaction between a dibasic acid and an aliphatic glycol, and a lactone-based polyester obtained by a ring opening polymerization of a lactone represented by γ-butyloactone, ε-caprolactone, and two or more kinds of the polyesters may be used together in a mixture.

A crystalline polyester used in the invention has the following fundamental structural formula:

$$-[O-R-O-\underset{\underset{O}{\|}}{C}-R'-\underset{\underset{O}{\|}}{C}]-$$

wherein R indicates a divalent aliphatic group and/or an alicyclic group having a branched chain or a non-branched chain and having 2 to 12 carbon atoms and preferably 2 to 8 carbon atoms in a carbon chain, while R' indicates a divalent aromatic group having 6 to 20 carbon atoms and preferably 8 to 12 carbon atoms in a carbon skeleton.

Examples of diols include ethylene glycol, trimethylene glycol, tetramethyleneglycol, hexamethylene glycol, neopentyl glycol, and cyclohexanedimethanol.

An amount from zero up to 25 mol % of a diol described above may be replaced with a second diol of the diols already described above or a diol expressed by the following general formula:

$$HO-[R''-O]_x-H$$

wherein R" indicates a divalent group having 2 to 4 carbon atoms and x can be an integer from 2 to 50.

Preferably used as a diol are ethylene glycol and tetramethylene glycol.

Aromatic dicarboxylic acids include, for example, terephthalic acid, isophthalic acid,
1,4-naphthalenedicarboxylic acid,
1,5-naphthalenedicarboxylic acid,
2,6-naphthalenedicarboxylic acid,
2,7-naphthalenedicarboxylic acid, diphenic acid and diphenylether-4,4'-dicarboxylic acid.

An amount from zero up to 20 mol % of the dicarboxylic acid may be replaced with a aliphatic dicarboxylic acid, for example, a succinic acid, maleic acid, fumaric acid, sebacic acid, and dodecanediacid.

The following components may be contained in each layer when required as far as heat resistance is not affected unfavorably thereby: other resins, elastomer components, compounds having a functional group for improving an adhesion, which are melt mixed, and various kinds of additive agents including, for example, an antioxidant, a coloring agent, an antistatic agent, a flame retarder, a reinforcing agent, a stabilizer, a forming auxiliary and a conductive material.

A tube of the invention exhibits a change amount in angle of ±10° or less in a shape retainability performance test, a change rate in inner diameter of ±2% or less in a dimensional stability performance test and a change rate in yield strength of ±30% or less in a flexibility retainability performance test. More preferably, a tube of the invention exhibits a change amount in angle ±5° or less in a shape retainability performance test, a change rate inner diameter of ±1% or less in a dimensional stability performance test and a change rate in yield strength of ±10% or less in a flexibility retainability performance test. These test methods will be described later.

In case where a change amount in angle in a shape retainability performance test falls outside the range off ±10°, there arises a fault in that the tube interferes with another member in the neighborhood thereof, and then becomes melted, worn, thereby reduced in strength and injured; in a case where a change rate in inner diameter in a dimensional stability performance test falls outside the range of ±2%, there arises a fault that a connecting section between the tube and other member will be less hermitically sealed; and in a case where a change rate in yield strength in a flexibility retainability performance test falls outside the range of ±30%, there arise a problem that a vibration from another member cannot be sufficiently absorbed and causes noise and the like.

A heat resistant plastic tube of the invention can be made by molding a resin composition containing components described above. Molding methods, which may be known methods, include, for example, a method in which components are kneaded and then molded, a method in which components are twin-screw extruded and then molded, and a method in which a tube is molded by means of tube extrusion. A heat resistant plastic tube of a multilayer structure as described above may be molded by means of any of known molding methods such as co-extrusion molding, extrusion coating and the like. For example, a tube of a multilayer structure may be efficiently molded by means of co-extrusion molding with plural extruders in number corresponding to required layer structure and a multilayer tube die. A heat tube with a bellows structure may be obtained by a method using a known corrugator machine, a method in which a tube is molded and then subjected to a thermal molding with a corrugated die or the like in a separate step.

EXAMPLES

The present invention is further described below based on examples. In the examples described below, the following methods are used for evaluation in a shape retainability performance test, a dimensional stability performance test and a flexibility retainability performance test.

(1) Thermal Bending Method

Figure 6:
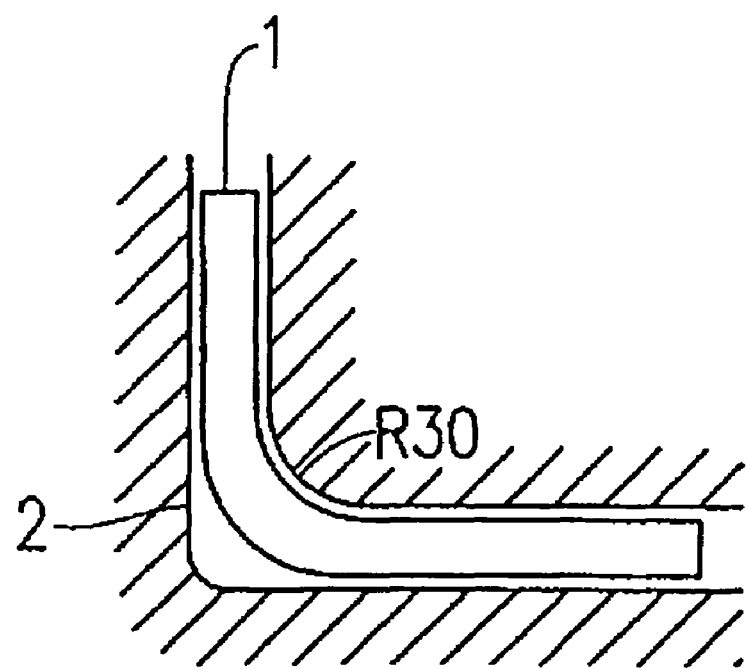
FIG. 6 is a plan view showing a thermal bending method of a tube.
Figure 7:
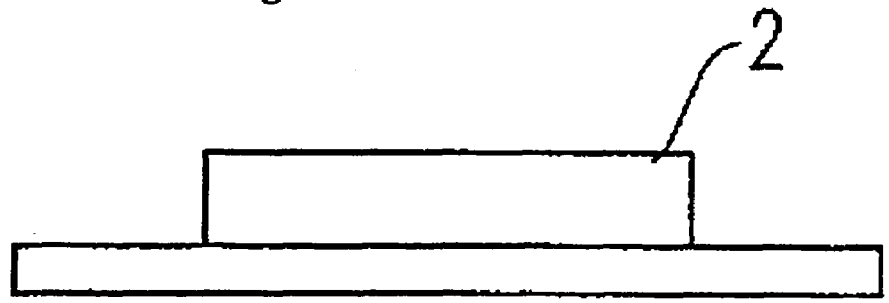
FIG. 7 is a front view showing the thermal bending method of a tube.

As shown in FIGS. 6 and 7, tubes 1 are set in thermal bending molds 2 with an angle of 90°, left in air ovens at temperatures 160° C., 180° C., 190° C. and 200° C., respectively, for 30 min and thereafter, taken out therefrom, and immediately cooled in water for 5 min.

(2) Evaluation Methods (2)-1 Evaluation Method of Shape Retainability Performance for Thermally Bent Tube Thermally bent tubes obtained in the foregoing thermal bending are heat-treated in the air oven at 150° C. for 1 hr, then taken out and immediately cooled in water for 5 min.

Figure 8A:
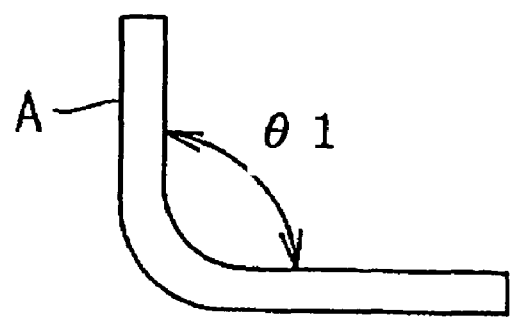
FIGS. 8A and 8B show views for an evaluation method of a shape retainability performance of a thermally bent tube.
Figure 8B:
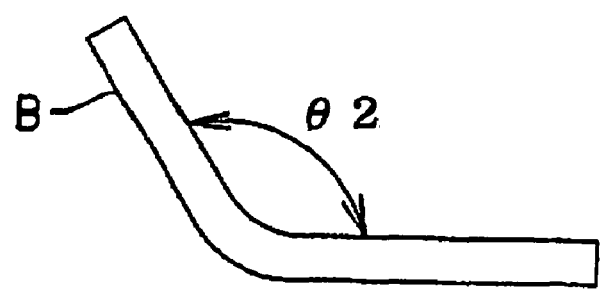

As shown in FIGS. 8A and 8B, a thermally bent tube A and a 150° C.×1 hr heat-treated tube B are measured on respective angles θ1 and θ2 to calculate a change amount in angle using the following expression.

A change amount in angle (°)=an angle θ2 (°) of a 150° C.×1 hr heat-treated tube B−(mimus) an angle θ1 (°) of a thermally bent tube A. Also described as the change amount in angle of shape retainability performance test (°) including in a thermally bent tube with an angle θ1 (°), an angle (θ2) (°) after a heat treatment in an air oven at 150° C. for 1 hr, followed by an immediate cooling in water for five min being measured, and then a change amount (θ2°-θ1°) being obtained.

(2)-2 Evaluation Method of Dimensional Stability Performance

In general, tubes for a motor vehicle are in most of cases used in a state being inserted or pressed into a connecting member, and therefore evaluation of a dimensional stability performance is conducted by measuring a change amount in inner diameter of a tube.

Inner diameter measurement is conducted by inserting a gauge into a tube and measuring a diameter of its end part.

A change rate in inner diameter (%)=100×(an inner diameter of end part of a tube after the thermal bending or further through the 150° C.×1 hr heat-treatment−an inner diameter of an unprocessed tube)/the inner diameter of the unprocessed tube. Also described as the a change rate in inner diameter in a dimensional stability performance test (%) including 100×(an inner diameter of a tube at an end after a thermal bending or further through a 150° C.×1 hr heat treatment−an inner diameter of an unprocessed tube at an end)/the inner diameter of the unprocessed tube at an end.

(3) Evaluation Method of Flexibility Retainability Performance

Evaluation of a flexibility retainability performance is conducted in a procedure in which a tube is actually subjected to a tensile test and a yield strength is measured.

In yield strength measurement, a tool of SAE J2043 is used to measure a yield strength at a pulling speed of 100 mm/min.

A change rate (%)=100×(a yield strength of a thermally bent tube or a 150° C.×240 hr heat-treated tube—a yield strength of an unprocessed tube)/the yield strength of the unprocessed tube. Also described as the change rate in yield strength in a flexibility retainability performance test (%) including 100×(a yield strength of a thermally bent tube or a thermally bent tube with a further 150° C.×240 hr heat treatment—a yield strength of an unprocessed tube)/the yield strength of the unprocessed tube, yield strength being measured by a tool of SAE J2043 at a pulling speed of 100 nm/min.

Example 1

A single layer tube of 8 mm in outer diameter, 6 mm in inner diameter and 1 mm in thickness was extruded and molded using a polyester-based elastomer of 550 MPa in bending elastic modulus measured by means of the ASTM D790 method.

Example 2

A single layer tube of 8 mm in outer diameter, 6 mm in inner diameter and 1 mm in thickness was extruded and molded using a polyester-based elastomer of 160 MPa in bending elastic modulus measured by means of the ASTM D790 method.

Example 3

A single layer tube of 8 mm in outer diameter, 6 mm in inner diameter and 1 mm in thickness was extruded and molded using a polyester-based elastomer of 480 MPa in bending elastic modulus measured by means of the ASTM D790 method.

Example 4

A single layer tube of 8 mm in outer diameter, 6 mm in inner diameter and 1 mm in thickness was extruded and molded using a polyester-based elastomer of 700 MPa in bending elastic modulus measured by means of the ASTM D790 method.

Example 5

A tube of a two layer structure of 8 mm in outer diameter, 6 mm in inner diameter and 1 mm in thickness was obtained by extrusion molding wherein the tube has an inner layer (0.9 mm in thickness) of polyester-based elastomer of 550 MPa in bending elastic modulus measured by means of the ASTM D790 method and an outer layer (0.1 mm in thickness) of polybutyleneterephthalate resin.

Example 6

A tube of a two layer structure of 8 mm in outer diameter, 6 mm in inner diameter and 1 mm in thickness was obtained by extrusion molding wherein the tube has an inner layer (0.9 mm in thickness) of polyester-based elastomer of 550 MPa in bending elastic modulus measured by means of the ASTM D790 method and an outer layer (0.1 mm in thickness) of polybutylenenaphthalate resin.

Example 7

By extrusion molding, a tube of a two layer structure of 8 mm in outer diameter, 6 mm in inner diameter and 1 mm in thickness was obtained wherein the tube has an inner layer (0.1 mm in thickness) of polybutyleneterephthalate resin and an outer layer (0.9 mm in thickness) of polyester-based elastomer of 550 MPa in bending elastic modulus measured by means of the ASTM D790 method.

Example 8

By extrusion molding, a tube of a two layer structure of 8 mm in outer diameter, 6 mm in inner diameter and 1 mm in thickness was obtained. The tube has an inner layer (0.1 mm in thickness) of polybutylenenaphthalate resin and an outer layer (0.9 mm in thickness) of polyester-based elastomer of 550 MPa in bending elastic modulus measured by means of the ASTM D790 method.

Example 9

By extrusion molding, a tube of a three layer structure of 8 mm in outer diameter, 6 mm in inner diameter and 1 mm in thickness was obtained. The tube has an inner layer (0.45 mm in thickness) of polyester-based elastomer of 160 MPa in bending elastic modulus measured by means of the ASTM D790 method, an intermediate layer (0.1 mm in thickness) of polybutyleneterephthalate resin and an outer layer (0.45 mm in thickness) of polyester-based elastomer of 550 MPa in bending elastic modulus measured by means of the ASTM D790 method.

Example 10

By extrusion molding, a tube of a three layer structure of 8 mm in outer diameter, 6 mm in inner diameter and 1 mm in thickness was obtained. The tube has an inner layer (0.45 mm in thickness) of polyester-based elastomer of 160 MPa in bending elastic modulus measured by means of the ASTM D790 method, an intermediate layer (0.1 mm in thickness) of polybutylenenaphthalate resin and an outer layer (0.45 mm in thickness) of polyester-based elastomer of 550 MPa in bending elastic modulus measured by means of the ASTM D790 method.

Comparative Example 1

A single layer tube of 8 mm in outer diameter, 6 mm in inner diameter and 1 mm in thickness was obtained by extrusion molding using an externally plasticized Nylon 11.

Comparative Example 2

A single layer tube of 8 mm in outer diameter, 6 mm in inner diameter and 1 mm in thickness was obtained by extrusion molding using an externally plasticized Nylon 12.

Comparative Examples 3 to 13

Tubes of 8 mm in outer diameter, 6 mm in inner diameter and 1 mm in thickness, having structures shown in tables were obtained by extrusion molding using materials shown in the tables. Thickness values (mm) of layers of Comparative Examples 3 to 13 are as follows:

Comparative Example 3: inner layer/intermediate layer/adhesive layer/outer layer=0.1/0.1/0.1/0.7

Comparative Example 4: inner layer/adhesive layer/outer layer=0.45/0.1/0.45

Comparative Example 5: inner layer/intermediate layer 1/intermediate layer 2/intermediate layer 3/outer layer=0.45/0.15/0.05/0.05/0.30

Comparative Example 6: inner layer/intermediate layer 1/intermediate layer 2/outerlayer=0.35/0.3/0.1/0.25

Comparative Example 7: inner layer/adhesive layer 1/outer layer=0.1/0.1/0.8

Comparative Example 8: inner layer/adhesive layer 1/intermediate layer/adhesive layer 2/outer layer=0.35/0.1/0.1/0.1/0.35

Comparative Example 9: inner layer/adhesive layer/outer layer=0.2/0.1/0.7

Comparative Example 10: inner layer/adhesive layer/outer layer=0.2/0.1/0.7

Comparative Example 11: inner layer/intermediate layer/outer layer=0.4/0.2/0.4

Comparative Example 12: inner layer/adhesive layer 1/intermediate layer/adhesive layer 2/outer layer=0.3/0.1/0.2/0.1/0.3

Comparative Example 13: inner layer/adhesive layer/outer layer=0.1/0.1/0.8

Physical properties were measured on the tubes obtained from the foregoing examples and comparative examples. Results of the tests are shown in Tables 1 to 4. Details of abbreviation in the tables are as follows:

(inner): tube inner layer
(outer): tube outer layer
PBN: polybutylenenaphthalate resin
PBT: polybutyleneterephthalate resin PA6: Nylon 6 resin
PA6-66: Nylon 6/66 copolymer resin
PA11: Nylon 11 resin
PA12: Nylon 12 resin
EVOH: ethylene-vinyl alcohol copolymer resin
ETFE: ethylene-tetrafluoroethylene copolymer resin
PVdF: polyvinylidene fluoride resin
THV: tetrafluoroethylene-hexafluoropropylene-vinylidene fluoride copolymer resin
PPS: polyphenylene sulfide resin A comprehensive evaluation of heat resistant tubes is shown in Table 1. In Table 1, evaluation criterion are as follows:

Shape retainability performance: change amount in angle: ±10° or less marked with ○ and outside ±10° marked with x Dimensional stability performance: change rate in inner diameter: ±2% or less marked with ○ and outside ±2% marked with x Flexibility retainability performance: change rate in yield strength: ±30% or less marked with ○ and outside ±30% marked with x Furthermore, change amounts in angle (evaluation criteria: ±10° or less) are shown in Table 2, change rate in inner diameter (evaluation criteria: ±2% or less) in Table 3 and change rate in yield strength (evaluation criteria: ±30% or less) in Table 4.

TABLE 1

| | tube structure | thermal bending temperature (° C.) in shape retainability performance | | | | dimensional stability performance | Flexibility retainability performance |
| --- | --- | --- | --- | --- | --- | --- | --- |
| | | 160 | 180 | 190 | 200 | | |
| example 1 | polyester-based elastomer single layer (bending elastic modulus: 550 MPa) | X | X | ○ | ○ | ○ | ○ |
| example 2 | polyester-based elastomer single layer (bending elastic modulus: 160 MPa) | X | X | ○ | ○ | ○ | ○ |
| example 3 | polyester-based elastomer single layer (bending elastic modulus: 480 MPa) | X | X | ○ | ○ | ○ | ○ |
| example 4 | polyester-based elastomer single layer (bending elastic modulus: 700 MPa) | X | X | ○ | ○ | ○ | ○ |
| example 5 | (inner) polyester-based elastomer (bending elastic modulus: 550 MPa)/ PBT(outer) | X | X | ○ | ○ | ○ | ○ |
| example 6 | (inner) polyester-based elastomer (bending elastic modulus: 550 MPa)/ PBN (outer) | X | X | ○ | ○ | ○ | ○ |
| example 7 | (inner) PBT/polyester-based elastomer (bending elastic modulus: 550 MPa) (outer) | X | X | ○ | ○ | ○ | ○ |
| example 8 | (inner) PBN/polyester-based elastomer (bending elastic modulus: 550 MPa) (outer) | X | X | ○ | ○ | ○ | ○ |
| example 9 | (inner) polyester-based elastomer (bending elastic modulus: 160 MPa)/ PBT/polyester-based elastomer (bending elastic modulus: 550 MPa) | X | X | ○ | ○ | ○ | ○ |
| example 10 | (inner) polyester-based elastomer (bending elastic modulus: 160 MPa)/ PBT/polyester-based elastomer (bending elastic modulus: 550 MPa) | X | X | ○ | ○ | ○ | ○ |
| comparative example 1 | Externally plasticized PA11 | ○ | deformed | melted | melted | X | X |
| comparative example 2 | Externally plasticized PA12 | ○ | melted | melted | melted | X | X |
| comparative example 3 | (inner) conductive ETFE/ETFE/adhesive resin/PA12 (outer) | ○ | melted | melted | melted | X | X |
| comparative example 4 | (inner)PA6/adhesive resin/PA12 (outer) | ○ | melted | melted | melted | X | X |
| comparative example 5 | (inner) PA6/EVOH/PA6/modified polyolefin/PA12 (outer) | ○ | melted | melted | melted | X | X |
| comparative example 6 | (inner) PA6/PA6 · 66/modified polyolefin/PA12 (outer) | ○ | melted | melted | melted | X | X |
| comparative example 7 | (inner)PBT/adhesive resin/PA12 (outer) | ○ | melted | melted | melted | X | X |
| comparative example 8 | (inner) PA12/adhesive resin/PBT/adhesive resin/PA12 (outer) | ○ | melted | melted | melted | X | X |
| comparative example 9 | (inner)THV/adhesive resin/PA12 (outer) | ○ | melted | melted | melted | X | X |
| comparative example 10 | (inner)PVdF/adhesive resin/PA12 (outer) | ○ | melted | melted | melted | X | X |
| comparative example 11 | (inner)PA12/PVdF/PA12 (outer) | ○ | melted | melted | melted | X | X |
| comparative example 12 | (inner) PA12/adhesive resin/PVdF/adhesive resin/PA12 (outer) | ○ | melted | melted | melted | X | X |
| comparative example 13 | (inner)PPS/adhesive resin/PA12 (outer) | ○ | melted | melted | melted | X | X |

TABLE 2

| | tube structure | thermal bending (160° C. × 30 min) after heat treatment (150° C. × 1 hr) of thermally bent tube | Thermal bending (180° C. × 30 min) after heat treatment (150° C. × 1 hr) of thermally bent tube | thermal bending (190° C. × 30 min) after heat treatment (150° C. × 1 hr) of thermally bent tube | Thermal bending (200° C. × 30 min) after heat treatment (150° C. × 1 hr) of thermally bent tube |
|---|---|---|---|---|---|
| example 1 | polyester-based elastomer single layer (bending elastic modulus: 550 MPa) | X | X | ○ | ◎ |
| example 2 | polyester-based elastomer single layer (bending elastic modulus: 160 MPa) | X | X | ○ | ◎ |
| example 3 | polyester-based elastomer single layer (bending elastic modulus: 480 MPa) | X | X | ○ | ◎ |
| example 4 | polyester-based elastomer single layer (bending elastic modulus: 700 MPa) | X | X | ○ | ◎ |
| example 5 | (inner) polyester-based elastomer (bending elastic modulus: 550 MPa)/PBT (outer) | X | X | ○ | ◎ |
| example 6 | (inner) polyester-based elastomer (bending elastic modulus: 550 MPa)/PBN (outer) | X | X | ○ | ◎ |
| example 7 | (inner) PBT/polyester-based elastomer (bending elastic modulus: 550 MPa) (outer) | X | X | ○ | ◎ |
| example 8 | (inner) PBN/polyester-based elastomer (bending elastic modulus: 550 MPa) (outer) | X | X | ○ | ◎ |
| example 9 | (inner) polyester-based elastomer (bending elastic modulus: 160 MPa)/ PBT/polyester-based elastomer (bending elastic modulus: 550 MPa) | X | X | ○ | ◎ |
| example 10 | (inner) polyester-based elastomer (bending elastic modulus: 160 MPa)/ PBT/polyester-based elastomer (bending elastic modulus: 550 MPa) | X | X | ○ | ◎ |
| comparative example 1 | Externally plasticized PA11 | X | ○ | deformed | Melted |
| comparative example 2 | Externally plasticized PA12 | X | ○ | melted | Melted |
| comparative example 3 | (inner) conductive ETFE/ETFE/adhesive resin/PA12 (outer) | X | ○ | melted | Melted |
| comparative example 4 | (inner)PA6/adhesive resin/PA12 (outer) | X | ○ | melted | Melted |
| comparative example 5 | (inner) PA6/EVOH/PA6/modified polyolefin/PA12 (outer) | X | ○ | melted | Melted |
| comparative example 6 | (inner) PA6/PA6 · 66/modified polyolefin/PA12 (outer) | X | ○ | melted | Melted |
| comparative example 7 | (inner)PBT/adhesive resin/PA12 (outer) | X | ○ | melted | Melted |
| comparative example 8 | (inner) PA12/adhesive resin/PBT/adhesive resin/PA12 (outer) | X | ○ | melted | Melted |
| comparative example 9 | (inner)THV/adhesive resin/PA12 (outer) | X | ○ | melted | Melted |
| comparative example 10 | (inner)PVdF/adhesive resin/PA12 (outer) | X | ○ | melted | Melted |
| comparative example 11 | (inner)PA12/PVdF/PA12 (outer) | X | ○ | melted | Melted |
| comparative example 12 | (inner) PA12/adhesive resin/PVdF/adhesive resin/PA12 (outer) | X | ○ | melted | Melted |
| comparative example 13 | (inner)PPS/adhesive resin/PA12 (outer) | X | ○ | melted | Melted |

◎: ±5° or less,
○: range from ±5° to ±10°,
X: outside ±10°

TABLE 3

| | | change percentage in inner diameter | | | | | |
|---|---|---|---|---|---|---|---|
| | tube structure | after thermal bending at 160° C. × 30 min | after heat treatment at 150° C. × 1 hr of thermally bent tube | after thermal bending at 180° C. × 30 min | after heat treatment at 150° C. × 1 hr of thermally bent tube | after thermal bending at 200° C. × 30 min | after heat treatment at 150° C. × 1 hr of thermally bent tube |
| example 1 | polyester-based elastomer single layer (bending elastic modulus: 550 MPa) | ◎ | ◎ | ◎ | ◎ | ◎ | ◎ |

TABLE 3-continued

| | | change percentage in inner diameter | | | | | |
|---|---|---|---|---|---|---|---|
| | | after thermal bending at 160° C. × 30 min | after heat treatment at 150° C. × 1 hr of thermally bent tube | after thermal bending at 180° C. × 30 min | after heat treatment at 150° C. × 1 hr of thermally bent tube | after thermal bending at 200° C. × 30 min | after heat treatment at 150° C. × 1 hr of thermally bent tube |
| | tube structure | | | | | | |
| example 2 | polyester-based elastomer single layer (bending elastic modulus: 160 MPa) | ⊚ | ⊚ | ⊚ | ⊚ | ⊚ | ⊚ |
| example 3 | polyester-based elastomer single layer (bending elastic modulus: 480 MPa) | ⊚ | ⊚ | ⊚ | ⊚ | ⊚ | ⊚ |
| example 4 | polyester-based elastomer single layer (bending elastic modulus: 700 MPa) | ⊚ | ⊚ | ⊚ | ⊚ | ⊚ | ⊚ |
| example 5 | (inner) polyester-based elastomer (bending elastic modulus: 550 MPa)/PBT (Outer) | ⊚ | ⊚ | ⊚ | ⊚ | ⊚ | ⊚ |
| example 6 | (inner) polyester-based elastomer (bending elastic modulus: 550 MPa)/PBN (outer) | ⊚ | ⊚ | ⊚ | ⊚ | ⊚ | ⊚ |
| example 7 | (inner) PBT/polyester-based elastomer (bending elastic modulus: 550 MPa) (outer) | ⊚ | ⊚ | ⊚ | ⊚ | ⊚ | ⊚ |
| example 8 | (inner) PBN/polyester-based elastomer (bending elastic modulus: 550 MPa) (outer) | ⊚ | ⊚ | ⊚ | ⊚ | ⊚ | ⊚ |
| example 9 | (inner) polyester-based elastomer (bending elastic modulus: 160 MPa)/PBT/polyester-based elastomer (bending elastic modulus: 550 MPa) | ⊚ | ⊚ | ⊚ | ⊚ | ⊚ | ⊚ |
| example 10 | (inner) polyester-based elastomer (bending elastic modulus: 160 MPa)/PBT/polyester-based elastomer (bending elastic modulus: 550 MPa) | ⊚ | ⊚ | ⊚ | ⊚ | ⊚ | ⊚ |
| comparative examp.1 | externally plasticized PA11 | ○ | X | X | X | — | — |
| comparative example 2 | externally plasticized PA12 | ○ | X | — | — | — | — |
| comparative example 3 | (inner) conductive ETFE/ETFE/adhesive resin/PA12 (outer) | ○ | X | — | — | — | — |
| comparative example 4 | (inner) PA6/adhesive resin/PA12 (outer) | ○ | X | — | — | — | — |
| comparative example 5 | (inner) PA6/EVOH/PA6/modified polyolefin/PA12 (outer) | ○ | X | — | — | — | — |
| comparative example 6 | (inner) PA6/PA6·66/modified polyolefin/PA12 (outer) | ○ | X | — | — | — | — |
| comparative example 7 | (inner) PBT/adhesive resin/PA12 (outer) | ○ | X | — | — | — | — |
| comparative example 8 | (inner) PA12/adhesive resin/PBT/adhesive resin/PA12 (outer) | ○ | X | — | — | — | — |
| comparative example 9 | (inner) THV/adhesive resin/PA12 (outer) | ○ | X | — | — | — | — |
| comparative example 10 | (inner) PVdF/adhesive resin/PA12 (outer) | ○ | X | — | — | — | — |
| comparative example 11 | (inner) PA12/PVdF/PA12 (outer) | ○ | X | — | — | — | — |
| comparative example 12 | (inner) PA12/adhesive resin/PVdF/adhesive resin/PA12 (outer) | ○ | X | — | — | — | — |
| comparative example 13 | (inner) PPS/adhesive resin/PA12 (outer) | ○ | X | — | — | — | — |

⊚: ±1% or less,
○: range between ±1% to ±2%,
X: outside ±2%

TABLE 4

| | tube structure | After thermal bending at 160° C. × 30 min | After heat treatment at 150° C. × 240 hr of thermally bent tube | after thermal bending at 180° C. × 30 min | after heat treatment at 150° C. × 240 hr of thermally bent tube | after thermal bending at 200° C. × 30 min | after heat treatment at 150° C. × 240 hr of thermally bent tube |
|---|---|---|---|---|---|---|---|
| | | Change percentage in yield strength | | | | | |
| example 1 | polyester-based elastomer single layer (bending elastic modulus: 550 MPa) | ◎ | ○ | ◎ | ○ | ◎ | ○ |
| example 2 | polyester-based elastomer single layer (bending elastic modulus: 160 MPa) | ○ | ○ | ○ | ○ | ○ | ○ |
| example 3 | polyester-based elastomer single layer (bending elastic modulus: 480 MPa) | ◎ | ○ | ◎ | ○ | ◎ | ○ |
| example 4 | polyester-based elastomer single layer (bending elastic modulus: 700 MPa) | ◎ | ○ | ◎ | ○ | ◎ | ○ |
| example 5 | (inner)polyester-based elastomer (bending elastic modulus: 550 MPa)/PBT (outer) | ◎ | ○ | ◎ | ○ | ◎ | ○ |
| example 6 | (inner)polyester-based elastomer (bending elastic modulus: 550 MPa)/PBN (outer) | ◎ | ○ | ◎ | ○ | ◎ | ○ |
| example 7 | (inner)PBT/polyester-based elastomer (bending elastic modulus: 550 MPa) (outer) | ◎ | ○ | ◎ | ○ | ◎ | ○ |
| example 8 | (inner)PBN/polyester-based elastomer (bending elastic modulus: 550 MPa) (outer) | ◎ | ○ | ◎ | ○ | ◎ | ○ |
| example 9 | (inner)polyester-based elastomer (bending elastic modulus: 160 MPa)/PBT/polyester-based elastomer (bending elastic modulus: 550 MPa) | ◎ | ○ | ◎ | ○ | ◎ | ○ |
| example 10 | (inner)polyester-based elastomer (bending elastic modulus: 160 MPa)/PBT/polyester-based elastomer (bending elastic modulus: 550 MPa) | ◎ | ○ | ◎ | ○ | ◎ | ○ |
| comparative example 1 | externally plasticized PA11 | ○ | X | ○ | X | X | — |
| comparative example 2 | externally plasticized PA12 | ○ | X | — | — | — | — |
| comparative example 3 | (inner) conductive ETFE/ETFE/adhesive resin/PA12 (outer) | ◎ | X | — | — | — | — |
| comparative example 4 | (inner)PA6/adhesive resin/PA12 (outer) | ○ | X | — | — | — | — |
| comparative example 5 | (inner) PA6/EVOH/PA6/modified polyolefin/PA12 (outer) | ○ | X | — | — | — | — |
| comparative example 6 | (inner) PA6/PA6 · 66/modified polyolefin/PA12 (outer) | ◎ | X | — | — | — | — |
| comparative example 7 | (inner)PBT/adhesive resin/PA12 (outer) | ○ | X | — | — | — | — |
| comparative example 8 | (inner) PA12/adhesive resin/PBT/adhesive resin/PA12 (outer) | ○ | X | — | — | — | — |
| comparative example 9 | (inner)THV/adhesive resin/PA12 (outer) | ◎ | X | — | — | — | — |
| comparative example 10 | (inner)PVdF/adhesive resin/PA12 (outer) | ○ | X | — | — | — | — |
| comparative example 11 | (inner)PA12/PVdF/PA12 (outer) | ○ | X | — | — | — | — |
| comparative example 12 | (inner) PA12/adhesive resin/PVdF/adhesive resin/PA12 (outer) | ○ | X | — | — | — | — |
| comparative example 13 | (inner)PPS/adhesive resin/PA12 (outer) | ◎ | X | — | — | — | — |

◎: ±10% or less,
○: range from ±10% to ±30%,
X: outside ±30%°

A heat resistant plastic tube of the invention can be thermally bent at a temperature in a use environment or higher and exhibits excellent retention in bent shape even after standing at the temperature in the use environment after the thermal bending. A recovery in a bent shape is low, a change in dimension is low and flexibility can be retainable. Thermal bending is possible at a temperature of 180° C. or higher, preferably 190° C. or higher and more preferably 200° C. or higher. When a tube is heat treated in an atmosphere at 150° C. for 1 hr after the thermal bending, a recovery in a bent shape is ±10° or less and a change in inner diameter is ±2% or less. When a tube is heat treated in an atmosphere at 150° C. for 240 hr after thermal bending, a change rate in yield strength is ±30% or less. Since structural materials of a multilayer tube of the present invention are all polyester-based materials, materials are re-usable. Since incineration disposal of the tube is possible, no toxic gas including NOx, SOx and halogen is generated, and the tube is very friendly to environment. The tube of the present invention enables light and compact piping in which strength and flexibility are balanced.

What is claimed is:

1. A heat-resistant plastic tube comprising:
at least one layer consisting essentially of a polyester-based elastomer including at least one of a polyester-polyester block copolymer with a polyester hard segment component made of naphthalenedicarboxylic acid and a soft segment component and a polyester-polyether block copolymer with a polyester hard segment component made of naphthalenedicarboxylic acid and a soft segment component with a bending elastic modulus from 160 MPa to 700 MPa;
wherein the tube exhibits a change rate in inner diameter of ±2% or less in a dimensional stability performance test, and a change rate in yield strength of ±30% or less in a flexibility retainability performance test.

2. The heat-resistant plastic tube according to claim 1, wherein the tube is a fuel feed tube usable within an engine compartment of a motor vehicle.

3. The heat-resistant plastic tube according to claim 1, wherein the tube further comprises a bellows portion extending at least part of its length.

4. The heat-resistant plastic tube according to claim 1, wherein the tube, after being set in a thermal bending mold with an angle of 90°, left in an air oven at a temperature of 190° C. or higher for 30 minutes and thereafter taken out therefrom and immediately cooled in water for 5 minutes, exhibits a change amount in angle of ±10° or less in shape retainability performance test rate.

5. The heat-resistant plastic tube according to claim 1, wherein the at least one layer further comprises at least one of a compound having a functional group for improving adhesion, an antioxidant, a coloring agent, an antistatic agent, a flame retarder, a reinforcing agent, a stabilizer, a forming auxilliary and a conductive material.

6. The heat-resistant plastic tube according to claim 1, wherein the tube consists essentially of a single layer of the polyester-based elastomer.

7. The heat-resistant plastic tube according to claim 6, wherein the tube is a fuel feed tube usable within an engine compartment of a motor vehicle.

8. The heat-resistant plastic tube according to claim 6, wherein the tube further comprises a bellows portion extending at least part of its length.

9. The heat-resistant plastic tube according to claim 1, wherein the tube comprises:
an inner layer consisting essentially of the polyester-based elastomer and an outer layer formed on the outside of the inner layer comprising a crystalline polyester-based resin.

10. The heat-resistant plastic tube according to claim 9, wherein the tube is a fuel feed tube usable within an engine compartment of a motor vehicle.

11. The heat-resistant plastic tube according to claim 9, wherein the tube further comprises a bellows portion extending at least part of its length.

12. The heat-resistant plastic tube according to claim 11, wherein an innermost of the layers has a surface resistivity in a range of from 102 to 109 W/sq.

13. The heat-resistant plastic tube according to claim 9, wherein an innermost of the layers has a surface resistivity in a range of from 102 to 109 W/sq.

14. The heat-resistant plastic tube according to claim 1, wherein the tube comprises an inner layer comprising a crystalline polyester-based resin and an outer layer formed on the outside of the inner layer consisting essentially of the polyester-based elastomer.

15. The heat-resistant plastic tube according to claim 14, wherein the tube is a fuel feed tube usable within an engine compartment of a motor vehicle.

16. The heat-resistant plastic tube according to claim 14, wherein the tube further comprises a bellows portion extending at least part of its length.

17. The heat-resistant plastic tube according to claim 16, wherein an innermost of the layers has a surface resistivity in a range of from 102 to 109 W/sq.

18. The heat-resistant plastic tube according to claim 14, wherein an innermost of the layers has a surface resistivity in a range of from 102 to 109 W/sq.

19. The heat-resistant plastic tube according to claim 1, wherein the tube comprises at least an inner layer consisting essentially of the polyester-based elastomer, an intermediate layer formed on the outside of the inner layer and comprising a crystalline polyester-based resin, and an outer layer formed on the outside of the intermediate layer consisting essentially of the polyester-based elastomer.

20. The heat-resistant plastic tube according to claim 19, wherein the tube is a fuel feed tube usable within an engine compartment of a motor vehicle.

21. The heat-resistant plastic tube according to claim 19, wherein the tube further comprises a bellows portion extending at least part of its length.

22. The heat-resistant plastic tube according to claim 21, wherein an innermost of the layers has a surface resistivity in a range of from 102 to 109 W/sq.

23. The heat-resistant plastic tube according to claim 19, wherein an innermost of the layers has a surface resistivity in a range of from 102 to 109 W/sq.

* * * * *